June 12, 1962 R. F. RYCHLIK 3,039,092
RADIO OBJECT LOCATING SYSTEM OF CONTINUOUSLY
VARIABLE FREQUENCY
Filed April 25, 1947 4 Sheets-Sheet 1

INVENTOR.
ROBERT F. RYCHLIK
BY
HIS ATTORNEYS

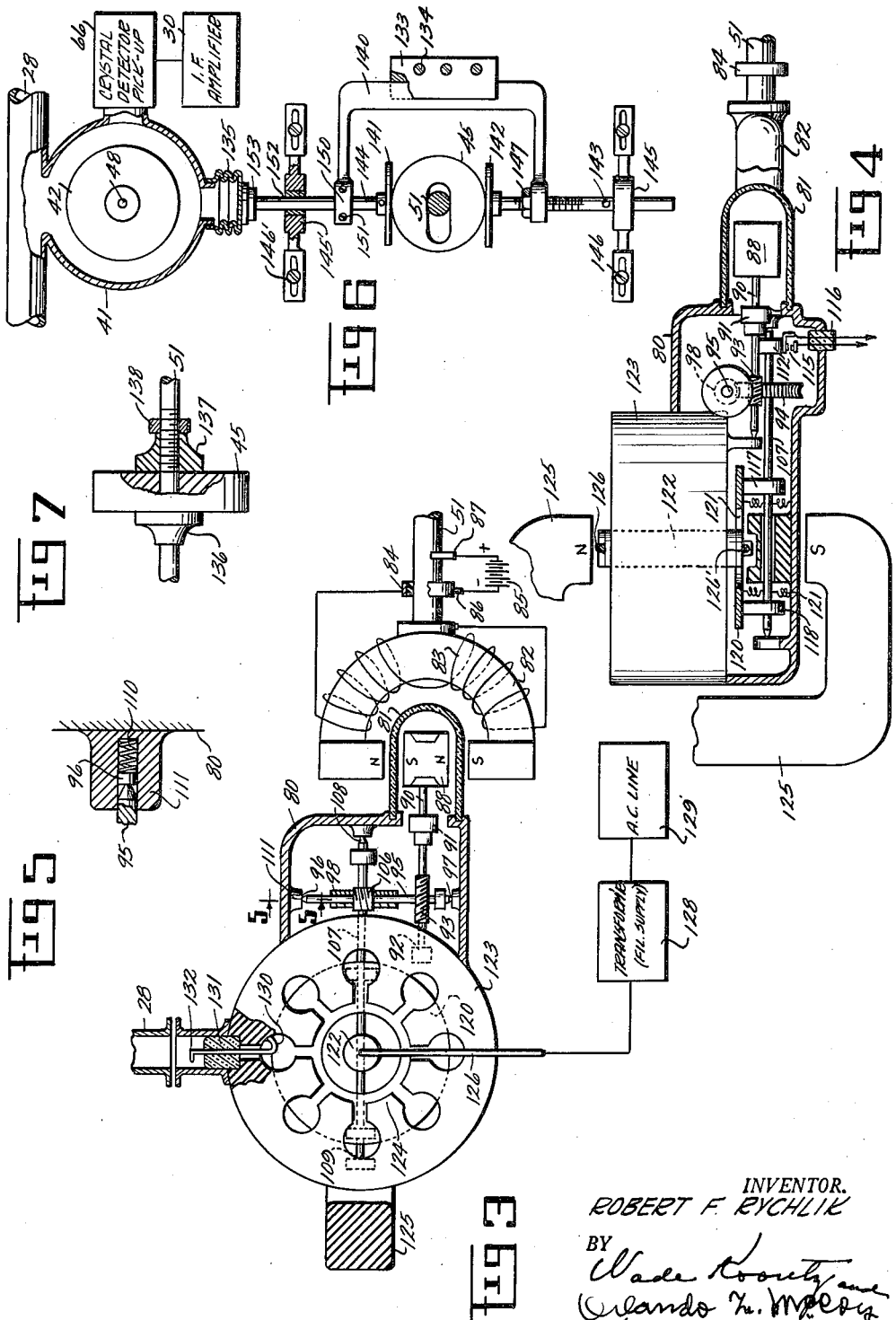

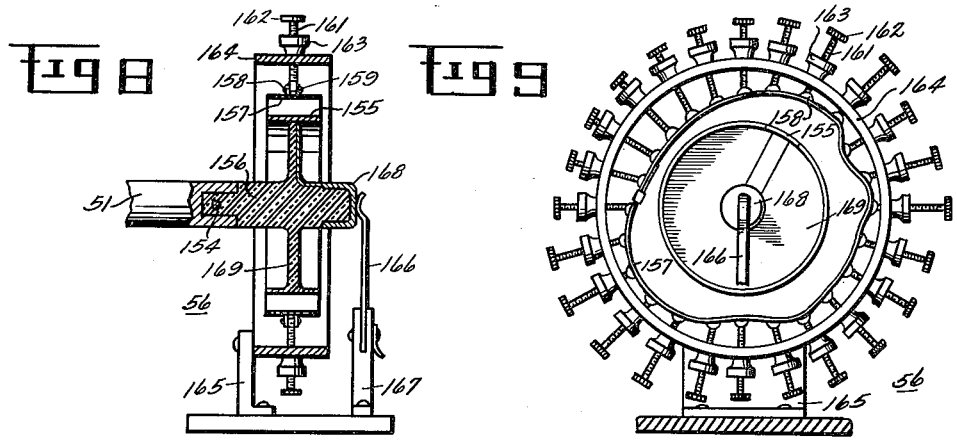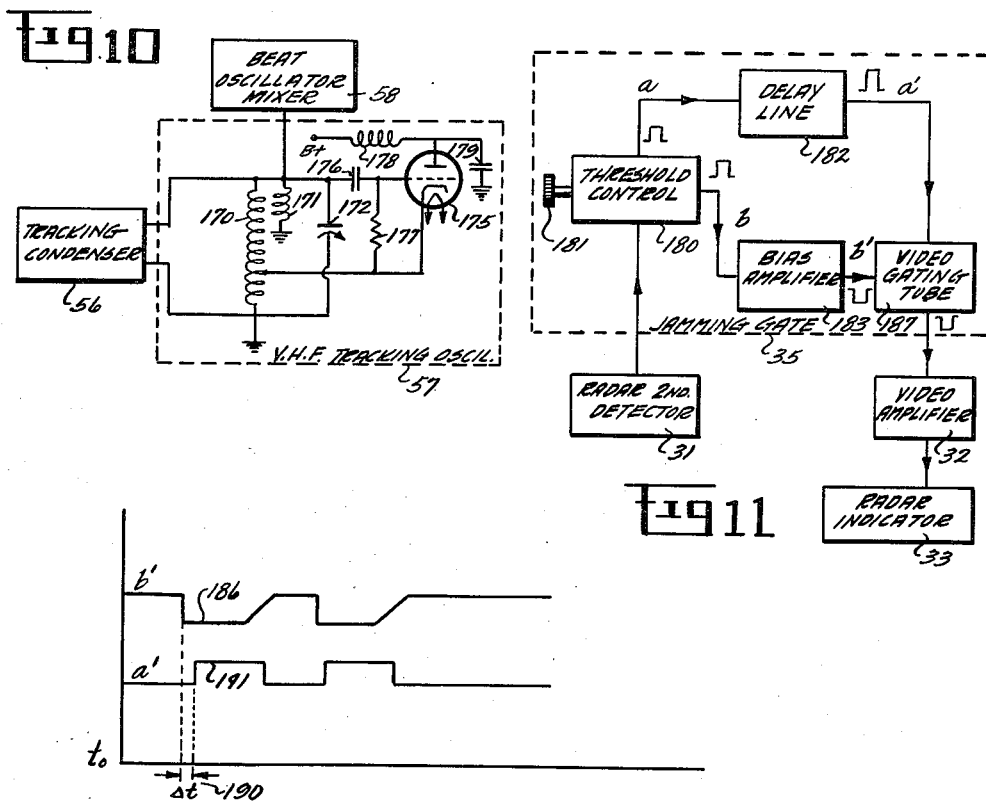

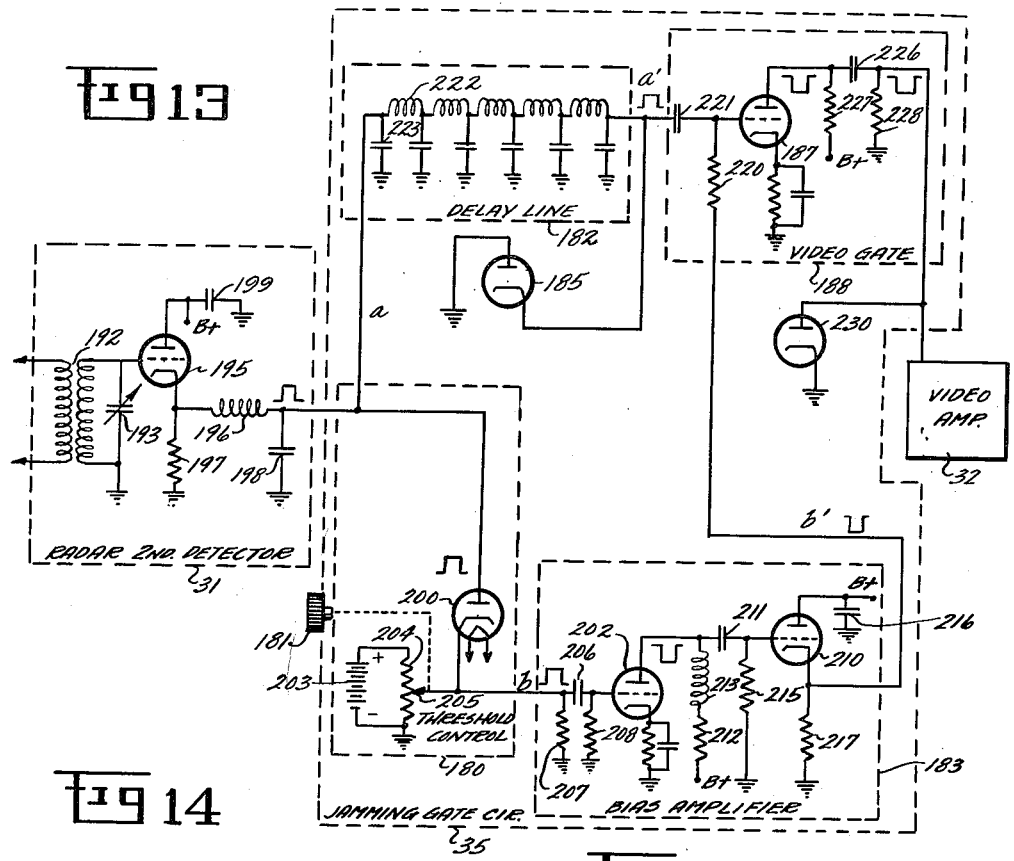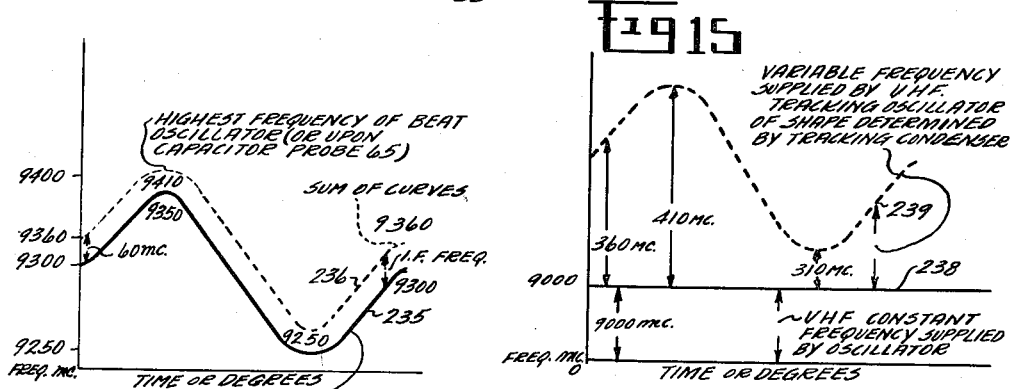

United States Patent Office 3,039,092
Patented June 12, 1962

3,039,092
RADIO OBJECT LOCATING SYSTEM OF CONTINUOUSLY VARIABLE FREQUENCY
Robert F. Rychlik, 220 Marathon Ave., Dayton, Ohio
Filed Apr. 25, 1947, Ser. No. 743,904
6 Claims. (Cl. 343—17.2)
(Granted under Title 35, U.S. Code (1952), sec. 266)

The invention described herein may be manufactured and used by or for the Government for governmental purposes without payment to me of any royalty thereon.

The present invention concerns a radar system and more particularly such a system that is adapted for successful signal transmission in the presence of jamming, objectionable interference and the like.

In the past radar systems that are exposed to jamming operations have been inadequate since no device has been perfected thus far in military operations for overcoming heavy jamming outputs from enemy held radar positions. In most previously existing anti-jamming devices, measures are directed toward attempts to obtain a satisfactory return in the presence of interference by separating the returned echo pulses or the desired responses from the enemy transmitted jamming signal that is intercepted by the receiver portion of the radar set when both the enemy jamming signal and the desired responses are being concurrently presented to the receiver.

In the exercise of the present proposed invention, the radar transmitter and the receiver are made to scan a spectrum of at least 100 megacycles in a continuous and automatic manner and at an irregular and relatively high rate with the receiver tracking the transmitter at all times so that it thereby reduces the time during which the jamming frequency is coincident with the signal frequency to a relatively small portion of the total time considered. During the major portion of the frequency sweep cycle, the operating frequency would be free of interference and for this reason will provide an improved radar indication as compared with a signal that is being jammed continuously and more particularly so if the receiver is blanked during the times when the jammer frequency is crossed by the radar frequency.

In the further exercise of the present invention, bright flashes upon the oscilloscope screen at those instances when jamming is encountered during the frequency sweep are avoided by the operation of a threshold control in a jamming gate circuit as by a separate gain control diode that is connected in parallel with a usual radar second detector. The separate gain control diode provides a cut off bias to the video system for a signal echo above an adjustable threshold when lasting longer than normal echoes. A slight video delay that is equal to the build up time of the biasing circuit is provided that delays the video presentation slightly and prevents a flash upon the oscilloscope screen at the instant that the jamming signal is intercepted by the receiver and is presented upon the oscilloscope screen.

In conformity with the present invention, the constantly changing radar frequency sweeping variably over a broad band provides a relatively large number of unjammed echo signals since even when a jammer of the noise type is encountered, the radar frequency sweep is sufficiently variable over a sufficiently broad band so that those echoes which are jammed occur only when the radar frequency coincides with the band of jammer frequencies, this being for relatively short intervals of time. Provision is made further whereby the majority of the radar returns from the direction of the jammer would be subject to satisfactory interpretation even in the presence of the jamming operation. The present invention provides interpretable presentations even in the presence of noise and pulse jamming or other forms of radio interference.

At the present time tunable magnetrons are available for use in the S band which permit a total variation of 100 megacycles. These older forms of tunable magnetrons are not suitable for rapid frequency changes however. The forms of tunable magnetron that are disclosed herein are adapted for use with rapid changes in the frequency of the pulse transmitted from the radar set. In some of these magnetrons, shafts are journalled in bearings and are operated under vacuum conditions which in the past has proved to be practical, as for example, in the use of revolving elements in X-ray tubes and the like.

Provision is also made in the magnetrons or other transmitting oscillators that are disclosed herein for the manual adjustment of frequency over a wide range in addition to being rapidly variable in frequency over a smaller range such as for example 100 megacycles or the like. With this provision, a coarse frequency setting may be made so that the radar system can be operated in any suitable part of a relatively wide spectrum. By such means, for example, a system could possibly be operated anywhere in a band 500 or 1000 megacycles wide. Rapid deviation would then occur about the chosen mid-frequency. In attaining this frequency mobility, the receiver part of the radar equipment that is contemplated hereby contains means for providing a corresponding adjustment of the high frequency fixed beating oscillator without introducing a serious disturbance of the transmitter-receiver tracking operation of the radar set.

In one form of the device that is disclosed herein, a manual frequency control is provided which varies the receiver and the transmitter frequencies concomitantly. This control enables the radar operator to skip from one to another part of the operating band by the manual manipulation of a single knob within the deviation range of the apparatus. As a matter of tactics, the operator would probably find it advisable to operate initially without resorting to continuous frequency scanning since by operation of the operating frequency band adjusting knob he could adjust the frequency of his radar set clear of jammer frequencies instantaneously by manual rotation of the knob.

In the presence of enemy jammers adapted to follow automatically the frequency of the radar set, the operator of the set can turn on a frequency sweep motor that provides a continuous frequency sweep and thereby avoid the jamming signal intercepted by his receiver and presented upon the screen of his oscilloscope. In the event the transmitting radar antenna were pointed continuously in the direction of the source of the jamming signal, it is unlikely that an enemy jammer could be designed which would be capable of following the random frequency changes of the present radar system transmitted by the radar antenna to any one azimuth sector. It is believed that the system that is disclosed herein could be successfully jammed in the event the enemy could bring into position a sufficient plurality of noise modulated jammers with their frequency limits so overlapped as to cover the full frequency range of the present system. In the course of military operations, it is believed that this would be not at all probable because of the considerable enemy equipment that it would be necessary to amass in one location and particularly if the present system were provided with the coarse frequency adjustment that would permit its operation at any desired portion of a wide band of, for example, 500 megacycles per second frequency.

In the disclosed embodiment of the present invention, the proposed radar system makes provision whereby the frequency of the transmitted radar signal may be varied at a moderately high rate of speed by means of a motor drive that is adapted for continuously changing the frequency of the whole system by the use of tracking devices shown herein. One tracking device means that is disclosed herein for varying the frequency of the transmitted signal comprises a resonant cavity that is tuned by means of a cam actuated movable plug. This means may be applied to tubes which have a cavity external to the tube and wherein hermetic sealing is not necessary in the cavity. The variable cavity tuning could be applied to a radio frequency transmission line to displace the frequency by pulling effect and further where a velocity modulation tube is used by driving a potentiometer in the repeller voltage circuit, to change the repeller voltage and consequently the oscillator frequency.

The frequency deviation methods that are described herein are believed to have superior tracking and frequency range characteristics as compared with pulling effect or repeller voltage variation methods known and used heretofore.

In order that the described variable frequency signal reflection or echo might be successfully received, the receiver beating oscillator frequency is made to track the transmitter by an amount equal to the IF frequency of the system within a few megacycles and within the operating range of the audio frequency cavity system. In the exercise of the present invention, this receiver beating oscillator frequency is obtained by combining a fixed source of high RF frequency with a variable tracking source of lower frequency in a suitable modulator and impressing an accurately determined resultant sum or difference frequency upon the receiver mixer circuit as a beat oscillator frequency. A filter is interposed between the receiver mixer circuit and the oscillator frequency combining circuit for the purpose of eliminating the original fixed oscillator frequency component and preventing its presence in the receiver mixer circuit. This provision is also advantageous in that it reduces the vulnerability to jamming to which the radar set would be subject in its absence.

It is believed that the method described herein of obtaining the beat oscillator frequency is characterized by greater precision than any comparable method that has been available heretofore.

One object of the present invention is to provide a radar system that is operable in the presence of enemy jamming without complete loss of beneficial function.

Another object is to provide a radar system wherein the desired presentation is momentarily interrupted and then resumed in the presence of a strong jamming signal of limited frequency band.

A further object is to provide means for maintaining precision frequency performance in radio sets and the like.

Another object is to provide improved means for maintaining a continuously and erratically changing signal frequency for use in radio equipment.

Another object is to provide signal frequency control means having superior tracking and frequency range characteristics as compared with prior existing comparable means.

A further object is to provide a radar system embodying improved tunable radio signal generating magnetron equipment.

Another object is to provide a radio system embodying improved radio signal frequency modulating means and method.

A further object is to provide a radio system embodying improved means for controlling the tuning of a resonant cavity.

Additional objects will be apparent to those informed in the electronics field from the following description of illustrative embodiments of the present invention and systems shown in the accompanying drawings and defined in the appended claims.

In the accompanying drawings:

FIG. 3 is a fragmentary partly sectioned view of a preferred form of magnetron adapted for use in the radio frequency unit circuit that is shown in FIG. 2;

FIG. 4 is a fragmentary partly sectioned view of the magnetron shown in FIG. 3 revolved 90° about its axis;

FIG. 5 is a fragmentary sectional view of a resilient jewel mount, taken along the line 5—5 of FIG. 3;

FIG. 6 is a fragmentary elevational view partly in section and partly diagrammatic of an adjustable variable cam and rider means for tuning a transmitter receiver resonant cavity in the radio frequency unit shown in FIG. 2;

FIG. 7 is a fragmentary elevational view partly broken away and partly in section of the cam shown in FIG. 6 rotated one fourth turn;

FIG. 8 is a fragmentary edge elevation partly in section of a tracking condenser in the radio frequency unit shown in FIG. 2;

FIG. 9 is an end elevation of the condenser shown in FIG. 8;

FIG. 10 is a schematic diagram of a very high frequency tracking oscillator receiving its input from the condenser shown in FIGS. 8 and 9 and also a part of the radio frequency unit shown in FIG. 2;

FIG. 11 is a block diagram of the jamming gate part of the circuit shown in FIG. 1;

FIG. 12 shows jamming and echo pulse signals in the jamming gate, with one group of high level pulses timed to lag the second group of signals sufficiently to block them from appearing upon the presentation screen of the indicator shown in FIG. 1;

FIG. 13 is a schematic circuit diagram of the jamming gate circuit shown in FIG. 11;

FIG. 14 is a graph of magnetron and intermediate frequency curves produced in the circuit shown in FIG. 2; and FIG. 15 is a graph of signal curves supplied by oscillators in the circuit shown in FIG. 2.

The circuit and components that are shown in FIGS. 1 to 14 of the accompanying drawings are those of a transmitter-receiver radar set that provides accurate satisfactory signal presentations in the presence of usual forms of enemy jamming signal and of natural interference. The circuit comprises designated components through which the described functional advantages were obtained.

Figure 1:
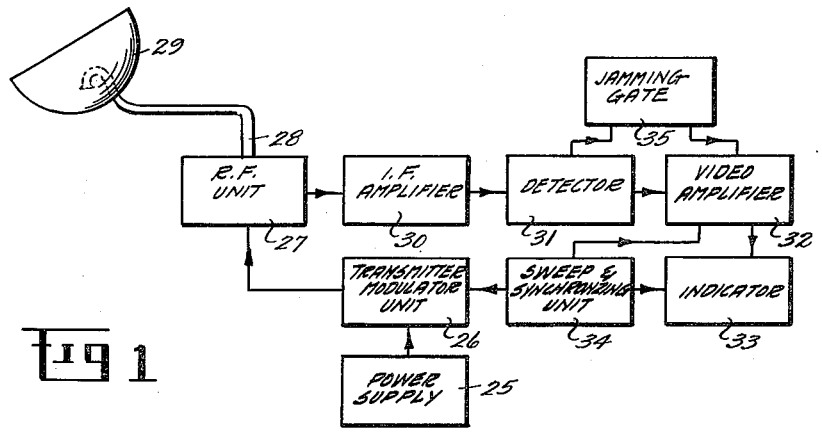
FIG. 1 is a block diagram of a radar system that embodies the present invention.

The circuit is shown in block diagram form in FIG. 1. In this circuit, energy from a power supply 25 is conducted to a transmitter modulator unit 26 from which it is conducted to a radio frequency unit 27 and wave guide 28 for pulsed radar radiation in usual manner from a parabolic antenna 29. Radio frequency energy pulses that are returned in the form of echoes to the radar antenna 29 are conducted by the wave guide 28 to the radio frequency unit 27 from which they are passed through an IF amplifier 30, detector 31 and video amplifier 32 for presentation upon the screen of an indicator 33 that may be a cathode ray tube in an oscilloscope or the like. The timing of the sweep and its synchronization with the output from the video amplifier 32 in the presentation upon the indicator 33, is provided by a sweep and synchronization unit 34 that is connected to both the transmitter modulator unit 26 and the video amplifier 32 as shown.

A jamming gate 35 that is connected across the detector 31 and video amplifier 32 operates to block out or prevent the presentation of jamming signal and natural interference upon the screen of the indicator 33 arriving simultaneously with the arrival of intelligence imparting echo pulses. The jamming gate 35 operates upon the theory that if enemy jamming of a relatively narrow range of frequencies is prevented from appearing as a part of the presentation upon the screen of the indicator 33, then intelligence imparting signals of frequencies outside of the range of the enemy jamming signal will be enabled, to appear as parts of the presentation upon the screen of the indicator 33.

This desirable result is attained by operation of the present invention primarily by momentarily blanking out the presentation of all received signals. The continuously fluctuating frequency of the intelligence transmitting signal shuttles back and forth through the narrow frequency band of enemy jamming signal with sufficient rapidity so that its presentation at the indicator 33 is substantially continuous in the absence of jamming signal presentation. Since the persistence of the screen of the cathode ray tube part of the indicator 33 is commonly up to three seconds and the desired intelligence imparting signal is being received back as echoes in microseconds, the functioning of the jamming gate 35 is of outstanding importance. The jamming gate 35 continuously prevents the presentation upon the screen of the cathode ray tube in the indicator 33 of enemy jamming signals which if they were there presented would appear as a brilliant smear that would completely obliterate the desired and useful echo signal presentation.

Figure 2:
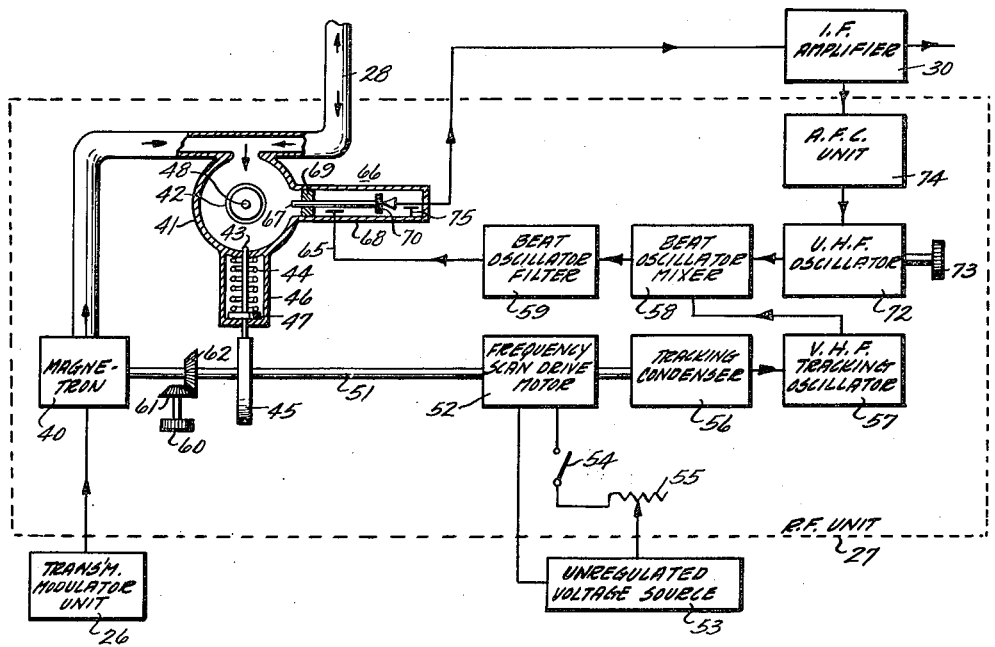
FIG. 2 is a diagram that is partly block and partly schematic of the radio frequency unit part of the circuit shown in FIG. 1.

The radio frequency unit 27, part of the circuit that is shown in FIG. 1, is shown in block diagram form and in elementary mechanical partly sectioned form and partly roughly schematic in FIG. 2 of the drawings. Radio frequency energy pulsed from the radar antenna 29 as radiated signal conducted by the wave guide 28 as such, originates at the magnetron 40 in the radio frequency unit 27 which is continuously tuned by operation of a motor 52. Reception of the wide range of continuously and erratically changing frequencies of the pulsed echo signals received is accomplished by operation of the continuously changing tuning of a transmitter receiver cavity 41 tuned by a cam 45 and by operation of a tracking condenser 56, both of which are actuated from the frequency scan drive motor 52. Preferably the drive motor 52 introduces at least some additional variation in the signal frequency sweep rate by being powered from an unregulated voltage source 53 from outside of radio frequency unit 27 and connected to motor 52 through motor energizing switch 54 with a motor speed control 55 in series.

The transmitter receiver cavity 41 contains an electrode 42, and a probe 43 for tuning the cavity. In FIG. 2, the probe 43 is a thrust member having its lower end yieldingly maintained in engagement with a cam 45 eccentrically mounted upon the shaft 51 of the motor 52 agianst the yielding compression of a spring 44. The spring 44 is interposed under compression between the wall of the cavity 41 and a collar 47 secured to the shaft of the probe 43. The spring 44 and shaft of the probe 43 are disposed within a housing 46. The housing 46 is attached at its upper end to the wall of the cavity 41 and is apertured at its lower end to provide a guide for the shaft of the probe 43 in its engagement with the cam 45. The probe 43 is in electrical connection with the wall of the cavity 41 in such a manner as to minimize electrical noise that would result from a mere frictional contact therewith. Suitable means is provided so that when the motor switch 54 is open, the position of the probe 43 within the interior of the cavity 41 may be established manually, as by the operation of a knob 60 that carries a small gear 61 and drives a larger gear 62 mounted upon and turning the motor shaft 51.

The frequency of the cavity 41 is further altered by suitable means, such as by the tracking condenser 56 that preferably continuously alters the frequency of the cavity 41 when the motor switch 54 is closed. The tracking condenser 56 applies its output to a very high frequency tracking oscillator 57 from which the output is passed to a mixer 58 and from the mixer 58 to a filter 59. The output from the filter 59 is passed to a probe 65 within a crystal detector pickup 66. The pickup 66 comprises essentially a short section of coaxial line opening into the cavity 41 at an attached end and closed at its other, unattached end.

AFC unit 74 is gated in such a manner that AFC control arises, not as a result of the received signal reflected to the radar, but as a function of the signal frequency generated at magnetron 40.

Echo signals intercepted by the radar antenna 29 and entering the wave guide 28 pass into the interior of the cavity 41 tuned by the probe 43. From the interior of the resonant cavity 41 echo signal passes to the crystal detector pickup 66, as to a probe 67 part thereof. The probe 67 is supported as an inner conductor within a short section of coaxial line outer conductor 68. The probe 67 is supported within the outer conductor 68 in usual manner, as by a dielectric spacer 69 of insulating Lucite or the like. A rectifying crystal 70 is disposed within the coaxial line and connected in series with the inner conductor or probe 67.

The output from the very high frequency tracking oscillator 57 that is variably tuned by the tracking condenser 56 is applied to the beat oscillator mixer 58 where it is beat against the output from an ultra high frequency oscillator 72 that is adjustably tuned by a manually adjustable oscillator frequency adjusting knob 73. The ultra high frequency oscillator 72 operates at a frequency range that is comparable to that of the radar transmission frequency and materially above that of the very high frequency tracking oscillator 57. In short, the operating frequency of oscillator 72 materially exceeds that of the oscillator 57. The intermediate frequency so established is passed through the beat oscillator filter 59 that applies its output to the probe 65 that extends into the interior of the coaxial line. Echo signals passing the crystal rectifier 70 are placed in a capacity relation with the outer conductor 68 of the coaxial line by means of a capacitor 75 that extends therefrom.

The rectified output from the inner conductor 67 of the coaxial line is passed to an intermediate frequency amplifier 30 outside of the radio frequency unit 27. A portion of the intermediate frequency RF energy of the IF amplifier 30 is passed therefrom through an automatic frequency control unit 74 to the ultra high frequency oscillator 72 from which it is applied to the beat oscillator mixer 58, as previously described. Under normal operating conditions in the absence of jamming, presentations upon the screen of the indicator 33 are of both the antenna 29 and the echo that is received therefrom.

A preferred form of the magnetron 40 indicated in FIG. 2 is shown in detail in FIGS. 3 and 4 of the drawings. The magnetron there shown comprises a housing 80 adapted for the disposition of operative parts therewithin. The housing 80 terminates at one end in a non-magnetic cap 81 that is sealed to the housing 80 in any desired manner. The shaft 51 of the motor 52 turns the poles of a rotatable electromagnet 82 continuously about the magnetron cap 81. The energization of the direct current electromagnet 82 is accomplished by a winding 83, one end of which is grounded to the motor shaft 51 and the other end of which is connected to a slip ring 84 that is insulated from the motor shaft 51. Direct current electrical energy of positive polarity is applied from a potential source 85 by means of a brush 86 or the like to the slip ring 84. The positive terminal of the potential source 85 is applied to the motor shaft 51 in a suitable manner as by another brush 87.

The rotation of the electromagnet 82 about the stationary non-magnetic cap 81 causes the rotation within the cap of a permanent magnet rotor 88. The permanent magnet rotor 88 is carried upon the end of an axially extending shaft 90 that is supported within the housing 80 by being journalled within a strap 91 adjacent to the rotor 88. The end of the shaft 90 remote from the rotor 88 rests pivotally upon the jewel 92. The shaft 90 carries a worm 93 that in turn engages a gear 94 to turn a second shaft 95 that is disposed normally to the shaft 90 across the magnetron housing 80. The second shaft 95 is journalled at its opposite ends in jewels 96 and 97. The second shaft 95 has a second worm 98 mounted thereon. The second worm 98 engages a small gear 106 mounted upon a third shaft 107 that extends axially of the magnetron housing 80 and substantially parallel to the shaft 90. The third shaft 107 is pivotally mounted within the magnetron housing 80 by means of the jewels 108 and 109 that are secured thereto. Since the temperature of the magnetron increases materially during operation, thermal expansion of the shafts 107 and 95 is compensated for in a desired manner as by backing at least one of each pair of shaft pivoting jewels, such as the jewel 96, with a compression spring 110 that is disposed within a jewel housing socket in a mount 111 that is secured to the magnetron housing 80.

The third shaft 107 carries a cam 112 adjacent its upper end. With each rotation of the shaft 107, the cam 112 opens a contact between a pair of phasing terminals 115 that are mounted within to extend through the magnetron housing 80 and insulated therefrom as by a glass bead 116 or the like. The third shaft 107 also carries second and third magnetron tuning cams 117 and 118. The cams 117 and 118 engage frictionally a magnetron tuning cam rider ring 120 against the yielding opposition of one or more tension springs 121 that each have one end connected to the ring 120 and the other end attached to the magnetron housing 80. The cam rider ring 120 is apertured centrally for the disposition of a magnetron cathode 122 therewithin. It will be noted that the ring 120 is maintained substantially equidistant concentrically outwardly of the cathode 122 as the tuning cams 117 and 118 cause it to move toward and away from an anode 123 part of the magnetron.

The magnetron housing 80 has extending therewithin and connected electrically therewith the magnetron anode 123 with the cathode 122 disposed at its center. The anode 123 comprises a desired plurality of radially inwardly extending segments 124 with radially extending cavities disposed between pairs thereof. In common with usual magnetron construction, the cathode 122 at the center of the anode 123 is disposed within the magnetic field and between the poles of a permanent magnet 125. The magnetron cathode 122 is supported in position and is connected by a pair of cathode leads 126 and 126' to a source of suitable filament supply such as a transformer 128 fed from an alternating current line 129. The cathode leads 126 and 126' are insulated from the anode 123 by glass beads, not shown, or the like. A radio frequency pickup probe 130 is disposed within one of the cavities of and is welded or otherwise secured to a cavity wall of the anode 123. The probe 130 is mounted to extend through the wall of the anode 123. The probe 130 is mounted to extend through the wall of the anode 123 as by a glass bead 131 or the like. The probe 130 continues through the bead 131 to externally of the magnetron anode 123 where it terminates in a loop 132 that is disposed within the wave guide 28. Radio frequency pulses originate at the loop 132 for conduction along the wave guide 28 before they are beamed from the radar antenna 29.

A preferred form of mechanism for tuning the transmitter-receiver cavity 41 is shown in FIG. 6 of the drawings. In this mechanism, tuning is accomplished preferably by means of an expansible Sylphon bellows 135 actuated from the cam 45 mounted eccentrically upon the motor shaft 51, to function as does the probe 43 that is shown in FIG. 2. In the assembly that is shown in FIG. 6, the cam 45 has an elongated slot extending radially from the center thereof for a sufficient distance to impart a desired degree of eccentricity to the cam 45 when mounted upon the motor shaft 51. The cam 45 is secured with respect to the shaft 51 in any desired manner and preferably by being clamped between a fixed collar 136 that is secured upon the shaft 51 and a movable collar 137 that preferably is threaded upon the shaft 51 and is secured in place by a nut 138 or the like.

A cam rider yoke 140 reciprocates in a slot in a bracket 133 secured by screws 134 to a rigid mount. The yoke 140 carries a fixed shoe 141 at one end and is tapped and threaded at its other end for the reception of an adjustable shoe 142 therein. The shoes 141 and 142 are of sufficient lateral dimension to maintain continuous frictional contact with the periphery of the cam 45 as it is rotated by motor shaft 51. This adjustable shoe 142 continues downwardly in a shaft portion that is turned with respect to the yoke 140 by a tool inserted within an aperture 143 in the shaft portion thereof. The lower end of the shaft portion of the adjustable shoe 142 is mounted for reciprocating action within a bracket 145 that is adapted to be secured to a rigid support. The bracket 145 is adjustable in its mounting, as by means of elongated slots in a pair of ear portions within which screws 146 may be adjustably positioned in securing the bracket to a support. A lock nut 147 serves to secure the movable contact shoe 142 snugly against the cam 45 so that it makes unrestricted frictional engagement therewith without binding. As the cam 45 rotates, the cam rider yoke 140 follows the variations in the disposition of the cam with respect to the motor shaft 51 as its center of rotation. The upper end of the cam rider yoke 140 carries a plate 150 secured by screws 151 clamped around a necked-in portion of the cylindrical sahft extending from the fixed shoe 141 so that the yoke 140 and shoe 141 move together. The shaft is adapted for reciprocating motion in an upper bracket 145'. The upper bracket 145' also is attached adjustably to a support by means of screws 146' that are disposed in elongated slots in the ears of the bracket. If preferred, the bracket 133 may be replaced by a key and key way 152 between the bracket 145' and the shaft 144 of the shoe 141 to arrest rotation of shaft 144.

The shaft of fixed shoe 141 terminates upwardly in a plate 153 that is attached by screws, or the like, not shown, to the base of the extensible bellows 135 that opens upwardly into the interior of the resonant cavity 41. The upper edge of the bellows 135 is attached by welding, soldering or the like to a boss part of the resonant cavity 41. The interior of the Sylphon bellows 135 is plated with silver or gold in usual manner. The compartment within the bellows 135 varies in depth with the rotation of the cam 45 and since it opens upwardly into the interior of the resonant cavity 41, it provides a continuously varying tuning thereof by operation of the cam 45 when the motor shaft 51 is rotated. When the cam shaft 51 is not rotated but is adjustably positioned by operation of the knurled knob 60 shown in FIG. 2, the bellows 135 under the control of the knob 60 provides a manual tuning to the resonant cavity 41.

The resonant cavity 41 is of an otherwise usual construction in that it has within its interior a usual T-R type vacuum tube having a pair of hollow conically tapered electrodes 42 and a standby electrode 48. The resonant cavity 41 opens diametrically opposite from the bellows 135 into the wave guide 28 and at another point into a crystal detector pickup 66. The crystal detector pickup 66 is of usual form and is connected to the IF amplifier 30, as shown in FIGS. 1 and 2.

Conformity of beat oscillator tracking to echo signals impinging on the antenna 29 is obtained by means of the tracking condenser 56 shown in FIGS. 2, 8, and 9. The tracking condenser 56 comprises a movable plate and a deformable fixed plate. The movable plate shown comprises a conductive capacitor plate 155 connected with a contact cap 168 upon the unattached end of a hub portion 156 continuing in a wheel portion 169, the hub and wheel portions being of insulation material. The insulating hub portion 156 is an insulating extension of the motor shaft 51 with its attached end seated within an axially extending cavity in the end of the motor shaft 51 to which it is secured by a pin 154 or the like. The conductive capacitor plate 155 may be continuous circumferentially of the wheel 169 if the wheel 169 is mounted eccentrically with respect to the shaft 51, where such construction is preferred, within the scope of this invention. The fixed plate of the tracking condenser 56 is preferably a flexible metal ribbon 157 that is positioned circumferentially outwardly of the movable capacitor plate 155. The ribbon 157 has a plurality of ears 158 disposed in pairs along its opposite edges at a desired plurality of positions. Each pair of ears 158 is attached to the radially inner end of an adjusting screw 161 as by means of a pin 159 passing therethrough or the like. Each screw 161 terminates radially outwardly in a cap 162. Locking nuts 163 secure the setting of the screws 161 for maintaining the contour of the ribbon 157 in a predetermined degree of irregularity with respect to a fixed ring 164 that is non-deformable and that is concentric with the insulating rod wheel hub portion 156 extending from the motor shaft 51. The fixed ring 164 is carried by a rigid support 165 that is grounded. Contact with the capacitor plate 155 is made in a preferred manner as by a brush 166 carried by an insulating support 167 so that the brush 166 makes continuous wiping engagement with a cap part 168 of the capacitor plate 155.

The tracking condenser 56 so provided is inductively coupled to or applies its output to the tracking oscillator 57. The brush 166 is connected into the oscillator 57 across a primary inductor 170 with a return through ground that is shown in FIG. 10. A secondary inductor 171 is inductively coupled with the primary inductor 170 and is interposed between the beat oscillator mixer 58 and ground. The primary inductor 170 is tuned by a variable trimming capacitor 172 that is connected across its full length. The inductor 170 is tapped intermediate its ends with the ungrounded tapped portion connected across the grid-cathode circuit of a tube 175. A capacitor 176 is interposed between the ungrounded plate of the trimming capacitor 172 and the grid of the tube 175. A resistor 177 is connected across the grid-cathode circuit of the tube 175. B+ potential is applied to the plate of the tube 175 through a radio frequency choke coil 178 with the plate grounded through a capacitor 179.

With this type of tracking oscillator receiving continuously variable output from the tracking condenser 56 an erratically and continuously varying output is applied to the beat oscillator mixer 58. The output from the beat oscillator mixer 58 is applied to the beat oscillator filter 59 and the sum of the oscillations over a wide band of frequencies is introduced into the crystal detector pickup 66 by way of the probe 65.

The radio frequency unit 27 provides a continuously and erratically modulated signal over a wide frequency range by operation of the variable tuning of the magnetron 40, the resonant cavity 41 and the tracking condenser 56, when the motor switch 54 is closed. When the motor switch 54 is open, manual adjustment of signal frequency is provided by the knob 60 for signal pulses from the magnetron 40 and for a predetermined tuning of the resonant cavity 41 by an established positioning of the cam 45 and of the tracking condenser 56, combined with an established manual tuning of the ultra high frequency oscillator 72 by operation of the knob 73.

The blanking out of jamming signal of a narrow band of frequencies from the presentation upon the indicator 33 is accomplished by means of the jamming gate 35, a block diagram of which is shown in FIG. 11 and a schematic diagram of which is shown in FIG. 13. Through the operation of the jamming gate 35, signal presentation on the screen of a cathode ray tube within the indicator 33 is blanked from appearing during the reception of jamming signal of a limited band of frequencies. The jamming gate 35 operates to blank out the signal and jamming presentation upon the screen of the cathode ray tube during the very brief time period when the signal frequency is within the frequency band of the jamming interference.

The Electronics Dictionary by Cooke and Markus, published in 1945 by McGraw-Hill Book Company, Inc., New York City, New York, defines blanking and blanking pulse at page 36. Paraphrased, in blanking, the reception or the presentation of one signal is prevented by the interference of a stronger signal and the stronger signal is the blanking signal. Gating in television is the application to the cathode ray tube grid or cathode of a voltage as a blanking pulse to remove trace lines from the screen of a cathode ray tube on each return sweep when the electron beam returns to start another line or frame. The jamming gate circuit 35 discriminates against all signals which exceed an amplitude threshold established by the setting by the knob 181 of the threshold control 180 by limiting their amplitude. The predetermined signal amplitude of a threshold so established does not exclude the receipt or presentation of legitimate echo signals when no jamming signal is applied but it limits them to a maximum amplitude as determined by the adjustment of the knob 181.

The jamming gate circuit 35 limits signals derived from the radar receiver and does not render the cathode ray tube inoperative. Two signals that are coincident in time and that are of the same amplitude and that are of opposite polarity or excursion, with one above the ground line and the other below the ground line in equal magnitude and duration, cancel each other out so that neither signal appears as a presentation that is either audible or visible and hence the intelligence of neither signal is transmitted to an audience.

The block diagram of the jamming gate as shown in FIG. 11 derives its input from the radar second detector 31 and this input is applied to a threshold control circuit 180 that is manually adjusted by operation of a knurled knob 181. The output from the threshold control circuit 180 is applied to a branch "*a*" providing the input for a delay line 182 and a branch "*b*" for providing input to a bias amplifier. 183. The output from the threshold control circuit 180 over both of the branch lines "*a*" and "*b*" is of rectangular pulse type as indicated. The delay line 182 applies its output which is in the form of a pulse wave, over the branch line "*a'*" to a video gating tube 187. The output from the bias amplifier 183 over circuit branch "*b'*" is of substantially the same shape, but is of opposite sign from its input over circuit branch "*b*" from the threshold control circuit 180 and also is applied to the same video gating tube 187. The video gating tube 187 applies its output, which is a negative square wave, to the video amplifier 32 where it is amplified and applied to a cathode ray tube within the radar indicator 33.

The theory of operation of the jamming gate 35, as applied to the time relationship between pulses that are intercepted simultaneously by the antenna 29 and fed from the wave guide 28 into the resonant cavity 41, is illustrated graphically in FIG. 12. The radar second detector 31 receives simultaneously echoes from pulse transmissions originating at the magnetron 40 and jamming signals from enemy positions or interferences from natural sources. Both the jamming signals and the echo pulses pass from the radar second detector 31 to the threshold control 180 from which they pass to circuit branches "*a*" and "*b*" leading to the delay line 182 and to the bias amplifier 183 respectively. Thus in branch "*b*" there is a component of the received signal which precedes the signal in branch "*a'*" by the duration of time delta *t* ($\Delta t$) introduced into branch "*a*" by the delay line 182. When jamming is encountered, the signal through branch "*b*" which is amplified in the bias amplifier 183 reaches the video gating tube 187 ahead of the signal which normally would come through branch "*a'*" to be amplified in the video amplifier 32 and presented in visual form on the radar indicator 33.

Upon receiving the high level jamming signal through branch "b'," the video gating tube 187 then becomes nonconducting and remains nonconducting until the jamming signal is removed from the circuits "a" and "b" by the operation of tuning the variable frequency system either manually or automatically as determined by the mode of jamming evasion chosen by the radar operator or alternately until the jamming signal level drops due to change in antenna direction or to other causes. The delayed pulse 191 containing the jamming signal is thus prevented by the application of the biasing pulse 186 to the gating tube 187 from passing through the gating tube circuit 188 and hence from presentation upon the screen of the indicator 33. The delay and gating tube bias effect so introduced by the jamming gate circuit 35 leaves the screen of the cathode ray tube in the indicator 33 dark for the succeeding presentation of intelligence transmitting echo signals in the absence of any presentation of jamming signals as the constantly changing frequency of the generated radio frequency energy cuts across the narrow band of frequency of the jamming radio frequency energy.

In the schematic circuit diagram of the jamming gate circuit 35, that is shown in FIG. 13, the output from the IF amplifier 30 is passed inductively through a transformer 192 with its secondary winding tuned by a variable capacitor 193 to the grid of a detector tube 195 in the second detector 31. B+ power is applied to the plate of the tube 195 with a capacitor 199 interposed between the power supply and ground. Cathode potential of the detector tube 195 is applied through a choke coil 196 to a circuit branch "a" leading to the delay line 182 and to the plate of a threshold tube 200 within the threshold control circuit 180. The cathode connected end of the choke coil 196 is applied to ground through a resistor 197 and its opposite end is grounded through a capacitor 198. The pulse output from the radar second detector 31 is a positive pulse, as indicated.

The threshold control tube 200 within the jamming gate circuit 35 acts as a diode rectifier with its cathode connected to a bias amplifier circuit 183 wherein it is applied to the grid of a first amplifying tube 202. The threshold control tube 200 is biased adjustably by the application of a controlled amount of positive potential by operation of the knob 181, as from a battery source 203 or the like. In the circuit shown the battery 203 is connected across a resistor 204 and the knob 181 adjusts the position of a movable contact 205 upon the resistor 204. This contact 205 is connected in common to the cathode of the threshold control tube 200 that is capacitively coupled by a capacitor 206 with the grid of the first amplifying tube 202 in the bias amplifier 183. The capacitor 206 has its opposite plates grounded through the resistors 207 and 208. The plate of the amplifying tube 202 is connected through a capacitor 211 with the grid of a second amplifier tube 210. B+ potential is applied to the plate of tube 202 through a resistor 212 connected in series with a choke coil 213. The grid of tube 210 is biased to ground through resistor 215. B+ potential is applied to the plate of tube 210 that is grounded through capacitor 216. The cathode of the tube 210 is grounded through resistor 217.

Cathode potential from the amplifying tube 210 is introduced over the circuit branch "b'" through resistor 220 to the grid of video gating tube 187 that also is coupled through a capacitor 221 with circuit branch "a'" from the delay line 182. The delay line 182 that is introduced along the circuit branch "a" from the output of detector 31 is of usual type and comprises inductive and capacitive values indicated by inductors 222 and capacitors 223 respectively. Any negative pulse output from the delay line 182 over circuit branch "a'" is grounded through rectifier tube 185 by being applied to the negative electrode thereof. Tube 185 is a direct current restoration tube and it rectifies any negative components in the signal at this point in the circuit.

The magnitude of the bias that is applied to the grid of the video gate tube 187 from the bias amplifier 183 is determined by the potential of the cathode of the tube 210 in the bias amplifier 183. The plate output from the gating tube 187 is coupled through capacitor 226 with the video system containing the amplifier 32. B+ potential is applied through resistor 227 to the plate of gating tube 187 at its junction with one of the plates of the capacitor 226. The other plate of the capacitor 226 is grounded through resistor 228. A rectifier 230 has its positive electrode connected with the junction of the resistor 228 and capacitor 226 in the output from the video gate circuit 188. This is done to maintain a steady base line.

Operatively, a signal from the intermediate frequency system upon arrival at the second detector 31 is applied to the grid of the tube 195 therein. This signal may contain radar echo signals and interfering jamming signals. The interfering signal may be assumed to be of greater strength than the echo signal and in the present invention this jamming signal is used to bias back the gating tube 187 in the video gate circuit 188 sufficiently so that the jamming signal is blanked from being presented upon the screen of a cathode ray tube within the indicator 33. The blanking of the jamming signals includes those echo pulses coincident in frequency therewith as the continuously varying frequency of the echo pulses cuts across the narrow band of the jamming signal.

The blanking of the jamming signal from the signal presentation is accomplished by impressing all signals from the second detector 31 upon the plate of the threshold tube 200 in the threshold control circuit 180. The threshold tube 200 is a diode with a positive potential from the battery 203 applied to its cathode. The positive potential so applied is of a magnitude depending upon the setting of the tap or contact 205 upon the resistor 204 by operation of the potentiometer knob 181. The threshold control tube 200 functions to rectify all signals that are impressed upon it and of an amplitude that exceeds that of the positive potential applied to its cathode from the battery 203. The control tube 200 presents little or no interference to and hence does not function to shut out the normal echo signal received by the antenna 29 and applied to the resonant transmitter receiver cavity 41. Normal echo signals in the output from the detector 31 are applied also along leg "a" to the delay line 182. These normal echo signals are amplified in the gating tube 187 and are passed to the radar video system illustrated by the video amplifier 32.

During the periods when the frequency of the output from the beating oscillator filter 59 causes the receiver to sweep across the frequency of the jamming signal, the interfering or jamming signal will travel through the detector tube 195 along with the usual radar echo signals. In the absence of the jamming gate circuit 35, this signal combination would cause a flash upon the viewing screen of the indicator 33 that would obscure the presentation of the echoes free from jamming and this flash would persist during the next succeeding period in which the tracking oscillator 57 sweeps on to a frequency outside of the range of that of the jamming signal frequency.

By operation of the gating circuit 188 that is disclosed herein, all signals from the detector tube 195 that are applied to the jamming gate circuit 35 are delayed slightly in the delay line 182. Strong jamming signals are rectified in the threshold control tube 200 and their rectified portions are amplified in the amplifying tubes 202 and 210 in the bias amplifier 183. The rectified portion of the strong jamming signals passes through threshold control tube 200, is amplified in the bias amplifier 183 and is then applied as a bias upon the grid of the gating tube 187 in the video gate 188 in sufficient time so that the gating tube 187 is biased to its cutoff voltage by the time radar echo signals plus strong jamming signals arrive at the grid of the gating tube 187 from the delay line 182.

In effect when signals get above a level of potential that is determined by the position of the tap or contact 205, upon the potentiometer resistance 204 in the threshold control circuit 180, the signals produce a cutoff bias in the gating tube 187 that prevents conduction therethrough and hence do not produce a bright flash upon a radar viewing screen in the indicator 33. The setting of the contact 205 on the threshold control potentiometer resistor 204 is such that jamming signals are momentarily cut off at the gating tube 187 together with normal radar echo signals.

It will be apparent that during the time the gating tube 187 is operating to cut off radio signals of jamming magnitude, it also cuts off normal echo signals since both signals are presented at the grid of the gating tube 187 simultaneously. Since the output from the beat oscillator filter 59 changes frequency at a relatively high rate, the time when the jamming signal is presented to the grid of the gating tube 187 is relatively short. Since there is no bright flash upon the indicator screen while the jamming signal is applied to the gating tube 187, the screen is sensitive to echo signal presentations before and after the echo frequency passes through the jamming frequency. For this reason, the target defined by the echo signals which normally would be screened by the jamming signal becomes apparent to the radar operator by its own radar reflection. The diodes 185 and 230 to which the output from the delay line 182 and the output from the video gate circuit 188 respectively are connected are placed in the circuit for the purpose of direct current restoration. The diode 230 operates to remove positive components from the negative pulse output of the video gate circuit 188.

In FIG. 14 of the accompanying drawings, a full line curve 235 illustrates the output of the magnetron 40 during the time when it is automatically tuned by the motor 52 and consequently this curve represents the relative frequency of echo pulses returning from the target and passed from the resonant cavity 41 as a difference frequency formed in crystal detector pickup 66 to the intermediate frequency amplifier 30, after beating with the oscillator frequency shown in curve 236.

In FIG. 15 of the drawings the straight full line curve 238 illustrates a predetermined constant frequency supplied by the ultra high frequency oscillator 72 and depends in magnitude upon the setting of the manually operated knob 73. The dashed curve 239 represents the continuously and variably changing frequency of the very high frequency tracking oscillator 57 when combined with the output from the ultra high frequency oscillator 72 and beats against the output therefrom in the mixer 58 to determine the frequency of the signal that is then filtered and passed through the crystal detector pickup 66 portion of the circuit for application to the IF amplifier 30.

The radar system choice of components and their association in the disclosed circuits has been submitted for the purposes of describing and explaining a working embodiment of the present invention and similarly operating modifications and substitutions may be made therein without departing from the scope of the present invention.

I claim:

1. In an echo type radio system wherein the received signals are reflections of the transmitted energy, an antenna for radiating and intercepting signal, a wave guide conducting radio energy to and from said antenna, a radio frequency unit connected by said wave guide with said antenna, a transmitter supplying radio energy for transmission to said antenna through said radio frequency unit and said wave guide, a receiver receiving radio energy originating in said transmitter and echoed from reflecting bodies through said antenna and wave guide and radio frequency unit, an indicator connected to both said transmitter and said receiver for normally providing visual presentations of radio energy transmitted and received back in echo form, a continuous variably tuned magnetron in said radio frequency unit supplying radio frequency energy for transmission by said wave guide, a tunable transmitter-receiver cavity in said radio frequency unit and opening into said wave guide, a frequency scan drive motor continuously variably tuning both said magnetron and said cavity, a continuously tuned tracking condenser in said radio frequency unit and actuated by said motor, a very high frequency tracking oscillator in said radio frequency unit and receiving its input from said tracking condenser and having an output, a variably tunable ultra high frequency oscillator in said radio frequency unit receiving its input indirectly from the said cavity and having an output, a beat oscillator mixer in said radio frequency unit and receiving its input from both said tracking oscillator and said variably adjustable ultra high frequency oscillator and having an output, a beat oscillator filter to which the output from said beat oscillator mixer is applied and having an output, a crystal detector pick up that essentially is a short section coaxial line having inner and outer conductors spaced and insulated from each other, a probe to which the output from said filter is applied and positioned between the inner and outer conductors of said crystal pick up, a crystal rectifier receiving its input from the inner conductor of said crystal detector pick up and having an output, an intermediate frequency amplifier receiving the output from said crystal rectifier and having its output divided in its application, and an automatic frequency control unit receiving its input from said intermediate frequency amplifier and applying its output to said ultra high frequency oscillator.

2. An echo type radio system wherein the received signals are reflections of the transmitted energy, comprising a signal emitting transmitter, a signal intercepting receiver, and an indicator for the visual presentation of signal, a radio frequency unit in the system and comprising a magnetron to which electrical power is supplied for the production of pulsed radio energy of substantially continuously variable frequency, a wave guide conducting signal from said magnetron, a transmitter-receiver cavity into which said wave guide opens, means for controllably tuning said magnetron, a motor for actuating said magnetron tuning means, a cavity tuning probe having one end extending into said cavity, a spring applying unidirectional resilient pressure to said probe, a probe actuating cam rotated by said motor and engaging said cam as rider at its end remote from that end projecting into said cavity for moving said probe against the yielding resistance of said spring, and a crystal detector pick up having a probe extending into said cavity as a receiving pick up for the application of signal to said indicator.

3. An echo type radio system wherein the received signals are reflections of transmitted energy, comprising a signal emitting transmitter, a signal intercepting receiver connected with said transmitter and receiving reflections from the energy transmitted therefrom, and a visual presentation signal indicator, said receiver comprising a detector circuit containing a condenser on which a bias is built up by high duty cycle signals and containing a variable resistance which sets the threshold of the bias so produced on the condenser, a video amplifier circuit, and means for cancelling out signal interference on the visual presentation signal indicator, to which signal interference cancelling out means the output from said detector circuit is applied and that applies its output to said video amplifier, said interference presentation blanking means comprising a variably adjustable threshold control tube having a grid to which the output from the detector circuit is applied and having a cathode, a threshold control resistor across which a direct current potential is applied, a movable contact engaging said threshold control resistor and connected with the cathode of said threshold control tube to provide an adjustably variable output therefrom, a bias amplifier circuit to which the output from the threshold control tube cathode is applied, a delay line circuit connected with said threshold control tube plate and to which the output from the detector circuit is applied, and a video gate circuit receiving as input the output from said delay line circuit with which the said video gate is capacitively coupled and biased by the output from said bias amplifier with which the video gate circuit is resistively coupled and having an output appearing as the output from said interference presentation blanking means applied through the video amplifier for presentation on the visual presentation signal indicator.

4. An echo type radio system wherein the received signals are reflections of transmitted energy comprising a signal emitting transmitter, a signal intercepting receiver connected with said transmitter and receiving reflections from the energy transmitted therefrom, and a visual presentation signal indicator displaying signal intercepted by said receiver, said receiver comprising a detector circuit, a video amplifier circuit, and means for cancelling out signal interference on the visual presentation signal indicator, to which signal interference cancelling out means the output from said detector circuit is applied and that applies its output to said video amplifier circuit, said means for cancelling out signal interference on the visual presentation signal indicator comprising a threshold control circuit receiving its input from said detector circuit, a bias amplifier circuit amplifying the output from said threshold control circuit, a video gate circuit containing a tube having a plate and a grid to which the bias amplifier circuit applies as grid bias the amplified output from said threshold control circuit, and a delay line circuit interposed in circuit between said detector circuit and the grid of the tube in said video gate circuit for imparting a delay to the passage of signal therebetween and wherein the bias amplifier circuit comprises a coupling first capacitor to one plate of which the output from said threshold control circuit is applied, a first resistor, a second resistor that with said first resistor separately connects the opposite plates of said first capacitor to ground, a first amplifier tube having plate grid and cathode electrodes with the first tube grid electrode capacitively coupled through said first capacitor with the output from the threshold control tube cathode, a second capacitor shunted resistor returning the first amplifier cathode to ground, a third capacitor to one plate of which the first amplifier tube plate is connected, a choke coil in series with a fourth resistor through which positive potential is applied to the first amplifier plate, a second amplifier having plate grid and cathode electrodes with the grid connected to the plate of said third capacitor not connected with the plate of said first amplifier for the reception of signal therefrom, a fifth resistor connecting the grid of the second amplifier to ground, positive power supply applied to the plate of said second amplifier, a capacitor connecting the plate of said second amplifier to ground, a sixth resistor connecting the cathode of the second amplifier to ground and the second amplifier cathode providing the output from the bias amplifier and connected to the video gate.

5. An echo type radio system wherein the received signals are reflections of transmitted energy, comprising a signal emitting transmitter, a signal intercepting receiver connected with said transmitter and receiving reflections from the energy transmitted therefrom, and a visual presentation signal indicator displaying signal intercepted by said receiver, said receiver comprising a detector circuit, a video amplifier circuit and means for cancelling out signal interference on the visual presentation signal indicator, to which signal interference cancelling out means the output from said detector circuit is applied and that applies its output to said video amplifier circuit, said means for cancelling out signal interference on the visual presentation signal indicator comprising a threshold control circuit connected with said detector to receive the output therefrom, a bias amplifier circuit connected with and amplifying the output from said threshold control circuit, a video gate circuit connected to receive as bias the output from said threshold control amplified by said bias amplifier, and a delay line circuit interconnected between said threshold control and said video gate circuit to delay the conduction of received signal therebetween and wherein the video gate circuit comprises a first coupling capacitor to one plate of which output from the delay line is supplied, a video gating tube having plate grid and cathode electrodes to the grid of which tube the plate of first coupling capacitor not connected to the output of the delay line is connected, a first resistor connected between the grid of the video gating tube and the output from said bias amplifier, a capacitively shunting second resistor through which the video gating tube cathode is returned to ground, a coupling third capacitor connected between the plate of said video gating tube and the video amplifier, a third resistor through which plate potential is applied to the plate of said video gating tube, and a fourth resistor through which the plate of said coupling third capacitor not connected to the plate of the video gating tube is applied to ground.

6. An echo type radio system wherein the received signals are reflections of transmitted energy, comprising a signal emitting transmitter, a signal intercepting receiver connected with said transmitter and receiving reflections from the energy transmitted therefrom, and a visual presentation signal indicator displaying signal intercepted by said receiver, said receiver comprising a detector circuit to which signal intercepted by said receiver is passed, a video amplifier circuit and means for cancelling out signal interference on the visual presentation signal indicator to both of which video amplifier circuit and means for cancelling out signal interference the output from said detector circuit is applied and that applies its output to said video amplifier circuit, said means for cancelling out signal interference on the visual presentation signal indicator comprising a threshold control circuit connected with said detector circuit and variably adjustable, a bias amplifier circuit connected with and amplifying the output from the threshold control circuit, a video gate circuit connected to receive as bias the output from said threshold control circuit amplified by said bias amplifier circuit, and a delay line circuit connected between said detector circuit and said video gate circuit and wherein a direct current restoration first diode comprising an anode and a cathode has its anode applied to ground and its cathode connected to the output from said delay line where connected to said video gate for the rectification of any negative components in the signal at this point in the circuit, and a second diode comprising anode and cathode electrodes with its cathode applied to ground and its anode applied to the output from the video gate and to the input to the video amplifier for removing any positive components in the signal at the video gate output.

References Cited in the file of this patent

UNITED STATES PATENTS

| | | |
|---|---|---|
| 1,472,470 | Hartley | Oct. 30, 1923 |
| 1,931,866 | Heising | Oct. 24, 1933 |
| 2,101,549 | Lamb | Dec. 7, 1937 |
| 2,153,756 | Hunt | Apr. 11, 1939 |
| 2,180,355 | Haffcke | Nov. 21, 1939 |
| 2,192,189 | Haffcke | Mar. 5, 1940 |
| 2,217,277 | Hunt | Oct. 8, 1940 |
| 2,315,442 | McRae | Mar. 30, 1943 |
| 2,356,414 | Linder | Aug. 22, 1944 |
| 2,401,489 | Lindenblad | June 4, 1946 |
| 2,412,991 | Labin | Dec. 24, 1946 |
| 2,412,994 | Lehmann | Dec. 24, 1946 |
| 2,415,253 | Linder | Feb. 4, 1947 |
| 2,415,591 | Henroteau | Feb. 11, 1947 |

(Other references on following page)

UNITED STATES PATENTS

| | | |
|---|---|---|
| 2,418,139 | Preisman | Apr. 1, 1947 |
| 2,419,572 | Laico et al. | Apr. 29, 1947 |
| 2,423,644 | Evans | July 8, 1947 |
| 2,425,352 | Sloss | Aug. 12, 1947 |
| 2,432,089 | Carter et al. | Dec. 9, 1947 |
| 2,432,380 | Carlson | Dec. 9, 1947 |

OTHER REFERENCES

The Radio Amateur's Handbook, page 112, twentieth edition, published 1943 by the American Radio Relay League.